United States Patent
Smith et al.

(10) Patent No.: US 8,058,378 B1
(45) Date of Patent: Nov. 15, 2011

(54) POLYVINYL CHLORIDE FORMULATIONS

(75) Inventors: Mark A. Smith, Natrona Heights, PA (US); Thomas Marti, Mars, PA (US); Bryan St. Onge, Hastings (CA); Henri St. Onge, Hastings (CA)

(73) Assignee: Underground Solutions Technologies Group, Inc., Poway, CA (US)

( * ) Notice: Subject to any disclaimer, the term of this patent is extended or adjusted under 35 U.S.C. 154(b) by 0 days.

(21) Appl. No.: 12/357,488

(22) Filed: Jan. 22, 2009

Related U.S. Application Data

(63) Continuation of application No. 11/598,451, filed on Nov. 13, 2006, now Pat. No. 7,842,769, which is a continuation of application No. 10/865,504, filed on Jun. 10, 2004, now abandoned.

(60) Provisional application No. 60/478,598, filed on Jun. 13, 2003.

(51) Int. Cl.
| | |
|---|---|
| B65C 3/26 | (2006.01) |
| B31F 5/00 | (2006.01) |
| B31F 1/22 | (2006.01) |
| B29C 47/00 | (2006.01) |
| B29C 65/00 | (2006.01) |
| B29C 43/22 | (2006.01) |
| C08F 14/06 | (2006.01) |

(52) U.S. Cl. ........ 526/344; 264/508; 156/157; 156/156; 156/205; 156/244.15; 156/285; 156/290

(58) Field of Classification Search ............... 156/157, 156/156, 205, 244.15, 285, 290; 264/508, 264/173; 526/344
See application file for complete search history.

(56) References Cited

U.S. PATENT DOCUMENTS

| | | | |
|---|---|---|---|
| 3,002,871 | A | 10/1961 | Tramm et al. |
| 3,276,941 | A | 10/1966 | Burns |
| 3,359,599 | A | 12/1967 | Martin et al. |
| 3,847,694 | A | 11/1974 | Stewing |
| 3,887,992 | A | 6/1975 | Parmann |
| 3,989,778 | A | 11/1976 | Osborne |
| 4,089,455 | A | 5/1978 | Fellers |
| 4,113,813 | A | 9/1978 | Wilson |

(Continued)

FOREIGN PATENT DOCUMENTS

DE 3639932 A1 6/1988

(Continued)

OTHER PUBLICATIONS

David W. Woods et al.; Pipeline Rehabilitation with Expanded and Oriented PVC; Underground Infrastructure Advanced Technology Conference, Washington, DC; Dec. 8-9, 2003.

(Continued)

*Primary Examiner* — William Cheung
(74) *Attorney, Agent, or Firm* — The Webb Law Firm

(57) ABSTRACT

An extrudable polyvinyl chloride composition comprising from 80 to 99.9 percent by weight polyvinyl chloride for use in extruding a first part and a second part, wherein a fusion joint between the first extruded part and the second extruded part is formed by: A) composition at least a portion of a first terminal edge of the first extruded part and a first terminal edge of the second extruded part; B) engaging the melted terminal edges; and C) maintaining pressure between the engaged terminal edges to create a fused joint having a strength that is at least 50% of the tensile strength of the extruded part as measured by ASTM D638-2a. The extruded parts can be pipe sections.

73 Claims, 2 Drawing Sheets

U.S. PATENT DOCUMENTS

| | | | |
|---|---|---|---|
| 4,135,961 A | 1/1979 | Yoshizawa et al. | |
| 4,258,935 A | 3/1981 | Rodrigo et al. | |
| 4,389,877 A | 6/1983 | Lacey | |
| 4,390,384 A | 6/1983 | Turner | |
| 4,507,119 A | 3/1985 | Spencer | |
| 4,610,670 A | 9/1986 | Spencer | |
| 4,619,642 A | 10/1986 | Spencer | |
| 4,642,155 A | 2/1987 | Ramsey | |
| 4,684,789 A | 8/1987 | Eggleston | |
| 4,695,335 A | 9/1987 | Lyall | |
| 4,780,163 A | 10/1988 | Haneline, Jr. et al. | |
| 4,786,088 A | 11/1988 | Ziu | |
| 4,792,374 A | 12/1988 | Rianda | |
| 4,813,160 A | 3/1989 | Kuznetz | |
| 4,880,579 A | 11/1989 | Murata et al. | |
| 4,933,036 A | 6/1990 | Shaposka et al. | |
| 4,963,421 A | 10/1990 | Dickinson et al. | |
| 4,987,018 A | 1/1991 | Dickinson et al. | |
| 5,007,767 A | 4/1991 | Stafford | |
| 5,013,376 A | 5/1991 | McElroy, II et al. | |
| 5,124,109 A * | 6/1992 | Drossbach | 264/508 |
| 5,141,580 A | 8/1992 | Dufour et al. | |
| 5,147,697 A | 9/1992 | Ijyuin et al. | |
| 5,241,157 A | 8/1993 | Wermelinger et al. | |
| 5,368,809 A | 11/1994 | Steketee, Jr. | |
| 5,385,173 A * | 1/1995 | Gargiulo | 138/98 |
| 5,399,301 A | 3/1995 | Menendez et al. | |
| 5,407,514 A | 4/1995 | Butts et al. | |
| 5,464,496 A | 11/1995 | Wilson et al. | |
| 5,469,891 A | 11/1995 | Lund et al. | |
| 5,546,992 A | 8/1996 | Chick et al. | |
| 5,554,332 A | 9/1996 | Schnallinger | |
| 5,595,651 A | 1/1997 | Pavel | |
| 5,671,952 A | 9/1997 | Ligh | |
| 5,720,411 A | 2/1998 | Darby et al. | |
| 5,743,299 A | 4/1998 | Chick et al. | |
| 5,778,938 A | 7/1998 | Chick et al. | |
| 5,794,662 A | 8/1998 | St. Onge et al. | |
| 5,802,689 A | 9/1998 | Sano | |
| 5,824,179 A | 10/1998 | Greig | |
| 5,921,587 A | 7/1999 | Lueghamer | |
| 5,924,455 A | 7/1999 | Jo et al. | |
| 6,123,110 A | 9/2000 | Smith et al. | |
| 6,156,144 A | 12/2000 | Lueghamer | |
| 6,156,832 A | 12/2000 | Bertelo et al. | |
| 6,201,053 B1 | 3/2001 | Dieckmann et al. | |
| 6,228,204 B1 | 5/2001 | Reinhardt et al. | |
| 6,228,312 B1 | 5/2001 | Boyce | |
| 6,299,820 B1 | 10/2001 | Weinstein | |
| 6,394,502 B1 | 5/2002 | Andersson | |
| 6,398,264 B1 | 6/2002 | Bryant, III | |
| 6,550,500 B2 | 4/2003 | Järvenkyläet et al. | |
| 6,550,514 B1 | 4/2003 | Andrew | |
| 6,608,142 B1 | 8/2003 | Weng et al. | |
| 6,629,547 B1 | 10/2003 | Yamaguchi et al. | |
| 6,946,050 B2 | 9/2005 | Dojan et al. | |
| 6,982,051 B2 | 1/2006 | St. Onge et al. | |
| 6,994,766 B2 | 2/2006 | Temple | |
| 7,269,520 B2 | 9/2007 | Marti et al. | |
| 2001/0048223 A1 | 12/2001 | Campbell | |
| 2001/0050278 A1 | 12/2001 | Chenault | |
| 2003/0080552 A1 | 5/2003 | Genoni | |
| 2004/0074837 A1 | 4/2004 | Vasse et al. | |
| 2005/0131123 A1 | 6/2005 | Hawrylko | |
| 2006/0004399 A1 | 1/2006 | van Ockenburg et al. | |
| 2006/0071365 A1 | 4/2006 | St. Onge et al. | |
| 2007/0068868 A1 | 3/2007 | Vasse et al. | |
| 2008/0257604 A1 | 10/2008 | Becker et al. | |

FOREIGN PATENT DOCUMENTS

| | | |
|---|---|---|
| DE | 41 31 442 A1 | 3/1993 |
| EP | 1041334 A1 | 10/2000 |
| FR | 1390498 | 2/1964 |
| GB | 2 268 431 A | 1/1994 |
| JP | 57-48299 | 5/1984 |
| JP | 59-93328 A | 5/1984 |
| JP | 62190396 A | 8/1987 |
| JP | 1110128 A | 4/1989 |
| JP | 02106325 A | 4/1990 |
| JP | 02107429 A | 4/1990 |
| JP | 3043054 B | 7/1991 |
| JP | 4229231 A | 8/1992 |
| JP | 05-058264 | 8/1993 |
| JP | 6226062 A | 8/1994 |
| JP | 9117641 A | 5/1997 |
| JP | 11-077834 | 3/1999 |
| JP | 2000033517 A | 2/2000 |
| JP | 2002021474 A | 1/2002 |
| WO | WO 9911361 A1 | 3/1999 |
| WO | WO 00/22334 A1 | 4/2000 |

OTHER PUBLICATIONS

ASTM International Standard Designation: D 638—02a; Standard Test Method for Tensile Properties of Plastics.

ASTM International Standard Designation: D 1784—02; Standard Specification for Rigid Poly (Vinyl Chloride) (PVC) Compounds and Chlorinated Poly (Vinyl Chloride) (CPVC) Compounds.

ASTM International Standard Designation: D 638—02a; *Standard Test Method for Tensile Properties of Plastics* Jan. 2003.

ASTM International Standard Designation: D 1784—02; *Standard Specification for Rigid Poly (Vinyl Chloride) (PVC) Compounds and Chlorinated Poly (Vinyl Chloride) (CPVC) Compounds* Feb. 2003.

American Water Works Association ANSI/AWWA C900-97 (Revision of ANSI/AWWA C900-89) AWWA Standard for Polyvinyl Chloride (PVC) Pressure Pipe and Fabricated Fittings, 4 in. Through 12 in. (100 mm Through 300 mm), for Water Distribution, Feb. 1, 1998.

American Water Works Association ANSI/AWWA C905-97 (Revision of ANSI/AWWA C905-88) AWWA Standard for Polyvinyl Chloride (PVC) Pressure Pipe and Fabricated Fittings, 14 in. Through 48 in. (350 mm Through 1,200 mm), for Water Transmission and Distribution, Feb. 1, 1998.

NSF/ANSI 61-2003e "Drinking water system components—Health effects"; NSF International Standard/American National Standard, Sep. 3, 2003.

"Standard Specification for Poly(Vinyl Chloride) (PVC) Pressure-Rated Pipe (SDR Series)" ASTM Designation: D 2241-00 (pp. 83-91), Sep. 2000.

"Standard Test Method for Apparent Hoop Tensile Strength of Plastic or Reinforced Plastic Pipe by Split Disk Method" ASTM Designation: D 2290-00 (pp. 99-103), Sep. 2000.

"Standard Test Method for Resistance to Short-Time Hydraulic Pressure of Plastic Pipe, Tubing, and Fittings" ASTM Designation: D 1599-99 (pp. 28-30), Mar. 2000.

"Standard Specification for Oriented Poly(Vinyl Chloride), PVCO, Pressure Pipe" ASTM Designation: D 14832-98 (pp. 1175-1179), Mar. 1999.

Plastic Pipe Institute, "PPI PVC Range Composition, Listing of Qualified Ingredients" TR-Feb. 2004, (pp. 1-55) Jan. 2004.

American Water Works Association, ANSI/AWWA C906-99 (Revision of ANSI/AWWA C906-90), AWWA Standard for Polyehtylene (PE) Pressure Pipe and Fittings, 4 in. (100 mm) Through 63 in. (1,575 mm), for Water Distribution and Transmission, Mar. 1, 2000.

ISCO Industries; Large Diameter Butt Fusion; http://www.isco-pipe.com/products_services/buttfusion_animation.htm; May 14, 2009; illustrations copyrighted in 1996.

U.S. Appl. No. 10/865,504, filed Jun. 10, 2004.

U.S. Appl. No. 11/598,451, filed Nov. 13, 2006.

U.S. Appl. No. 12/511,459, filed Jul. 29, 2009.

Zhao et al., "Effect of Joint Contamination on the Quality of Butt-Fused High-Density Polyethylene (HDPE) Pipe Joints"; Institute for Research in Construction 2002; http://www.nrc-cnrc.gc.ca/obi/irc/doc/pubs/nrcc45337/nrcc45337.pdf.

U.S. Appl. No. 11/244,123, filed Oct. 5, 2005.

U.S. Appl. No. 12/102,298, filed Apr. 14, 2008.

U.S. Appl. No. 10/788,921, filed Feb. 26, 2004.

U.S. Appl. No. 11/005,306, filed Dec. 6, 2004.

\* cited by examiner

POLYVINYL CHLORIDE FORMULATIONS

CROSS REFERENCE TO RELATED APPLICATIONS

This application is a continuation of U.S. patent application Ser. No. 11/598,451, filed Nov. 13, 2006, now U.S. Pat. No. 7,842,769, which is a continuation of U.S. patent application Ser. No. 10/865,504, filed Jun. 10, 2004, now abandoned, which claims priority from U.S. Provisional Patent Application No. 60/478,598, filed Jun. 13, 2003, each of which are incorporated herein by reference in their entireties.

BACKGROUND OF THE INVENTION

1. Field of the Invention

The present invention is directed to a polymer, and in particular to a formulation of polyvinyl chloride for use in repairing or relining pipelines, such as for delivering water or gas under pressure, for gravity drain applications such as sanitary or storm sewer systems, or for utility conduit applications.

2. Description of Related Art

Conduit systems are used extensively throughout the world in order to transfer or convey material, such as water and other fluids, from location to location for distribution throughout the system. For example, extensive conduit systems are used to distribute water to both residences and businesses for use and further processes. Typically, such conduit or piping systems are located underground, as aboveground piping would be both unsightly and intrusive.

Typical water conduit systems transport material through pipe, e.g., cast iron, ductile iron, reinforced concrete, asbestos-cement, etc., buried underground with the branches extending in various directions in order to reach the end user. Normally, with age or for some other reason, the present piping fails and begins to leak, thereby reducing line pressure and unnecessarily allowing water to leak into the area surrounding the piping. Such leaks not only affect the system, but increase the processing costs of the supplier which, in turn, increases the end user costs. Therefore, these leaks must be quickly repaired and preventative measures taken to ensure that further leakage is prevented.

Due to the underground positioning of the conduit system, repairing a leaking pipe is particularly labor intensive and time consuming. Trenches must be dug along the pipeline to locate the leak and effectively repair it prior to putting the pipe back in service. Various lining systems have been developed according to the prior art in an attempt to seal a leaking pipe or a pipe that has fallen into disrepair, whether to repair a present crack or to preventatively ensure against future cracks or breaks.

In addition, when a smaller diameter pipe is pulled through a larger diameter pipe, the joints formed between sections of pipe must be sufficiently strong to withstand the forces associated with pulling the pipe. In other words, the joints must not break or lose their integrity.

In another example, a method of pipe installation has been developed, as disclosed in U.S. Pat. No. 5,794,662 to St. Onge et al., specifically directed to pressurized pipeline applications. The St. Onge patent is directed to a method of relining sewer lines, water lines or gas lines, and uses a segmented liner of reduced size relative to the pipe being relined. However, as opposed to merely leaving the small diameter liner conduit within the large diameter outer conduit, the method of the St. Onge patent uses heat and/or pressure to mold the reduced size pipe to the shape of the pipe being relined. In particular, the inner or liner conduit is a thermoplastic pipe, typically a polyvinyl chloride (PVC) pipe that, when exposed to heat or pressure, expands and molds against the inside of an existing conduit to effect the relining of it. This process allows for both the lining of the entire length of pipe or only a portion of it that is damaged, which is typically referred to as "spot repair."

According to the St. Onge patent, once the length of the liner conduit is inserted into the existing or host conduit, the liner conduit is plugged at either end and exposed to steam under pressure to heat the liner conduit along its length and apply pressure, which urges it to expand and contact the interior walls of the surrounding host conduit. Once the liner conduit has fully expanded to conform to the interior surface of the existing conduit, it is cooled and the plugs are removed. The resulting expanded liner conduit conforms to the walls of the host conduit, thereby preventing any further leakage. Also, the method of the St. Onge patent requires only trenches to be dug at either end of the section to be repaired.

While the St. Onge patent represents an advance in the art of relining or repairing underground conduit systems, there is room in the art for additional improvements and advancements. One such area is in the type of material used to form the liner conduit. A commonly used material for manufacturing conduit and pipe as mentioned above is polyvinyl chloride.

It is known to use extruded PVC pipe in conduit systems. Certain thermoplastic pipe, in particular PVC pipe, when heated and exposed to pressure, can be expanded and molded against the inside of an existing or host pipe to effect relining thereof. Furthermore, it is possible to have joints between pipe segments and subject the joined pipes to the required heat and pressure with the resultant combination expanded and molded against the host pipe to be relined with the integrity of the joints being maintained. The pipe segments can be of traditional sections, easily installed due to the reduced diameter and merely appropriately sized once properly located.

Published standards for PVC pipe used in water lines are available (see for example *PPI PVC Range Composition, Listing of Qualified Ingredients TR*-2/2004, Plastics Pipe Institute, Washington, D.C., 2004) and provide lists of acceptable additives and ranges therefor that can be used. However, known combinations of additives do not work in the conduit expansion process. In particular, fusion joints formed between pipe sections either break on expansion or burst when exposed to in-line water pressure and/or are too weak to withstand the pull force applied as the PVC pipe is pulled through an existing conduit. More particularly, existing extruded PVC water pipes do not fuse to form fusion joints that are anywhere near as strong as the extruded pipe itself.

One example of a PVC formulation includes, in parts per hundred of resin: 100 PVC resin, 0.3-1.0 heat stabilizer, 0.4-1.5 calcium stearate, 0.6-1.5 paraffin wax, 0-0.3 polyethylene wax, 0.5-3.0 titanium dioxide, 0-5.0 calcium carbonate, 0-2.0 process aid and 0-5.0 colorant as recited in *PPI PVC Range of Composition, Listing of Qualified Ingredients*, published by the Plastics Pipe Institute. However, prior art PVC formulations that fall within the ranges set forth in this PPI standard do not appear to achieve the desired expansion or fusion joint strength properties required for PVC liner conduit utilized in relining and/or conduit expansion processes.

Thus, a need remains for the formulation of polyvinyl chloride that has excellent elastomeric and expandability properties and/or form fusion joints approaching the strength of the extruded PVC pipe itself, and that can be used for relining water mains, fire protection lines, gravity drain systems and utility conduit applications.

SUMMARY OF THE INVENTION

It is, therefore, an object of the present invention to provide a formulation of polyvinyl chloride to overcome the deficiencies of the prior art. It is another object of the present invention to provide a formulation of polyvinyl chloride that has improved elastomeric and expandability characteristics and properties. It is a still further object of the present invention to provide a formulation of polyvinyl chloride appropriate to form fusion joints that approach the strength of the extruded PVC pipe itself. It is yet another object of the present invention to provide a formulation of polyvinyl chloride that is particularly useful in connection with relining water mains, fire protection lines, gravity drain systems and utility conduit applications.

The present invention is directed to an extrudable polyvinyl chloride composition comprising from 80 to 99.9 percent by weight polyvinyl chloride for use in extruding a first part and a second part, wherein a fusion joint between the first extruded part and the second extruded part is formed by:

A) melting at or above a melting temperature of the polyvinyl chloride composition at least a portion of a first terminal edge of the first extruded part and a first terminal edge of the second extruded part;

B) engaging the melted terminal edges; and

C) maintaining pressure between the engaged terminal edges to create a fused joint having a strength that is at least 50% of the tensile strength of the extruded part as measured by ASTM D638-2a.

The present invention is also directed to an extruded part that includes the above-described polyvinyl chloride composition to a joint that includes these resultant characteristics and, in particular, to an extruded part that is a section of pipe.

The present invention, both as to its construction and its method of operation, together with the additional objects and advantages thereof, will best be understood from the following description of exemplary embodiments when read in connection with the accompanying drawings.

DETAILED DESCRIPTION OF THE INVENTION

Other than in the operating examples or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The present invention provides an extrudable polyvinyl chloride composition capable of forming a fusion joint between a first extruded part and a second extruded part, where the strength of the fusion joint is at least 50%, in some cases at least 60%, in other cases at least 70%, in some instances at least 80%, in other instances at least 90% and in some instances at least 95% of the tensile strength of the extruded part as measured by ASTM D638-2a. In some embodiments of the invention, the fusion joint can be as strong as or stronger than the extruded part, for example the fusion joint can be 100% or more of the tensile strength of the extruded part. The strength required can vary depending on the intended use of the extruded part. As a non-limiting example, the extruded part can be a section of pipe, and the fusion bond strength must be sufficiently high so that the pipe sections do not pull apart when the pipe is pulled through an existing conduit, or installed as part of other rehabilitative or other pipe installation methods. Further, the fusion joint must be sufficiently strong to maintain its integrity during expansion operations, as well as withstanding the pressure and wear and tear involved in daily service.

Figure 1:
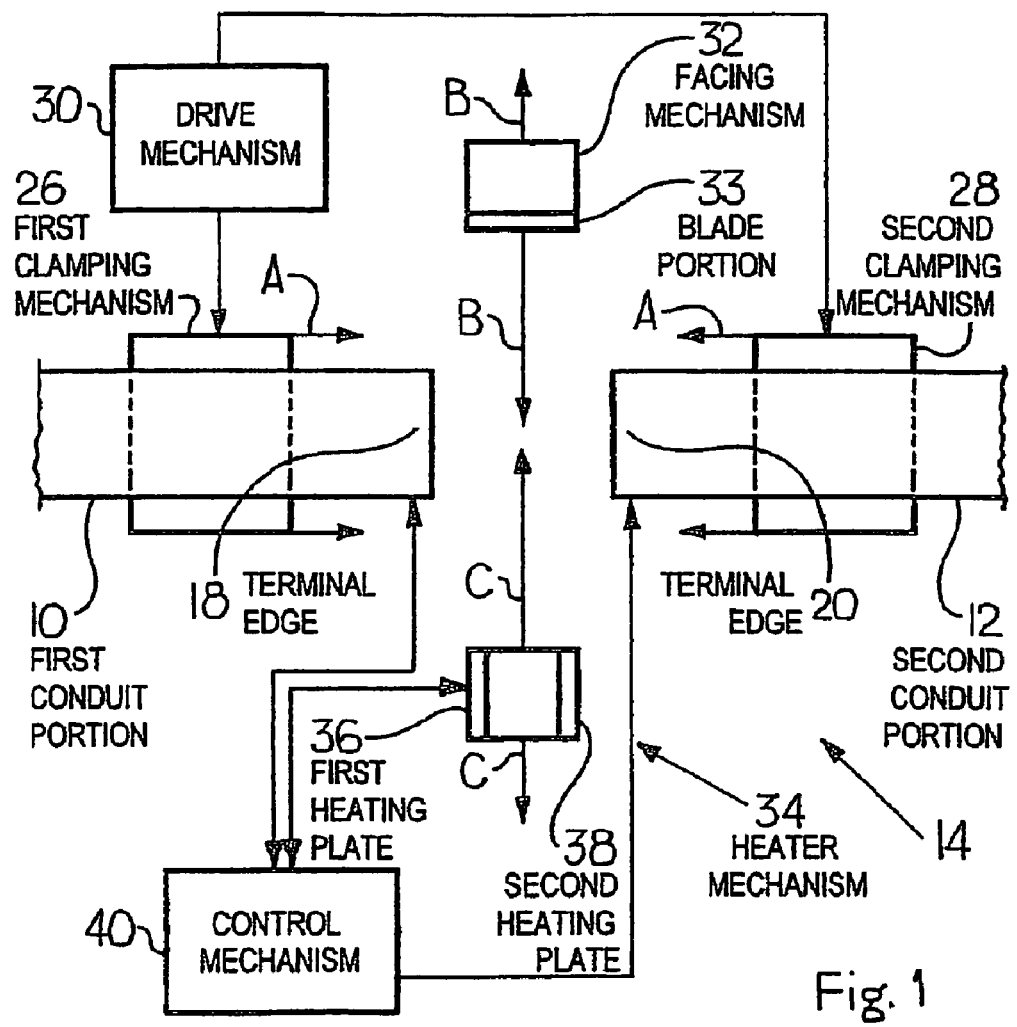
FIG. 1 is a schematic view of an apparatus and system for a fusion process for conduit according to U.S. Pat. No. 6,982,051.
Figure 2:
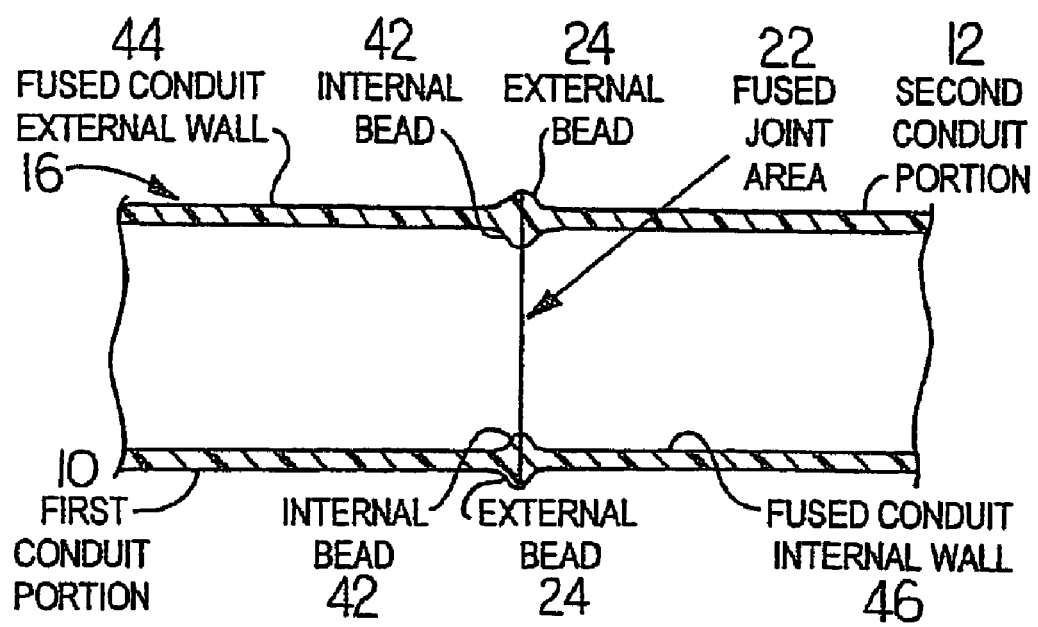
FIG. 2 is a side sectional view of a fused joint area resulting from the fusion process for conduit according to FIG. 1.

Typically, the fusion joint is formed by melting at or above a melting temperature of the polyvinyl chloride composition at least a portion of the first terminal edge of the first extruded part and a first terminal edge of the second extruded part; engaging the melted terminal edges; and maintaining pressure between the engaged terminal edges to create a fused joint. The method of forming the fusion joint is disclosed in co-pending U.S. application Ser. No. 10/788,921 filed Feb. 26, 2004 (now U.S. Pat. No. 6,982,051), which is hereby incorporated by reference. As shown in FIGS. 2 and 3 of U.S. Pat. No. 6,982,051, the terminal edge 18 of the first conduit portion 10 and the terminal edge 20 of the second conduit portion 12 are heated or melted to the required temperature, interface pressure and time duration. In doing so, the heat will penetrate into the first conduit portion 10 and second conduit portion 12 and a molten "bead" of material will form at the terminal edged (18, 20). This heating process is effected by a heater mechanism 34, which heats and melts both terminal edges (18, 20) simultaneously. FIGS. 2 and 3 of U.S. Pat. No. 6,982,051 are shown herein as FIGS. 1 and 2 for reference.

The present extrudable polyvinyl chloride composition can contain at least 80%, in some cases at least 85%, in other cases at least 90% and in some situations at least 95% polyvinyl chloride based on the weight of the composition. Also, the extrudable polyvinyl chloride composition can contain up to 99.95%, in some cases 99.9%, in other cases up to 99.5% and in some instances up to 99% polyvinyl chloride by weight. The amount of polyvinyl chloride in the extrudable polyvinyl chloride composition will depend on the amount of other additives included in the composition. The amount of polyvinyl chloride can be any value or range between any values recited above.

In an embodiment of the invention, the polyvinyl chloride composition will include virgin polyvinyl chloride and in particular embodiments, exclusively virgin polyvinyl chloride. As used herein, the term "virgin polyvinyl chloride" refers to polyvinyl chloride that has not been previously molded, extruded or compounded to form an article.

In an embodiment of the invention, the polyvinyl chloride has a number average molecular weight (Mn) of at least 20,000, in some cases at least 30,000, and in other cases at least 40,000. Also, the polyvinyl chloride has an Mn of up to 100,000, in some cases up to 95,000, and in other cases up to 90,000. The molecular weight of the polyvinyl chloride can be determined by gel permeation chromatography using polystyrene standards. The Mn of the polyvinyl chloride can be any value or range between any of the values recited above.

When non-virgin polyvinyl chloride is used, it can often behave as a filler material, as described below, and not be homogeneously co-mingled with the virgin polyvinyl chloride. In an embodiment of the invention, when non-virgin polyvinyl chloride is used, it is melt blended with virgin polyvinyl chloride in order to minimize the above-described "filler effect."

A number of additives can be included in the present extrudable polyvinyl chloride composition so long as the composition is able to form fusion bonds as described above and/or possess the properties required for successful expansion operations. Non-limiting examples of materials that can be included in the extrudable polyvinyl chloride composition include other resins, heat stabilizers, lubricants, fillers, colorants, compounds capable of providing protection against ultraviolet (UV) radiation, processing aids, as well as other ingredients known in the art.

The present polyvinyl chloride composition can be formed by melt blending the various components, or by dry blending followed by melting the various components using methods known in the art. The composition is then extruded using known methods to form an article or part, in some embodiments, a section of pipe.

As used herein, the term "heat stabilizer" refers to materials that prevent, inhibit, or slow the degradation of PVC at the elevated temperatures required in thermoplastic processing. As a non-limiting example, heat stabilizers inhibit dehydrochlorination, auto-oxidation, mechano-chemical chain scission, crosslinking and/or condensation reactions of the PVC. Any suitable material that acts as a heat stabilizer and either aids in or does not substantially interfere with the fusion bonding and/or expansion properties of the PVC can be used in the invention. Non-limiting examples of heat stabilizers that can be used in the invention include the THERMO-LITE® heat stabilizers available from ATOFINA Chemicals, Inc. Philadelphia, Pa.; the MARK heat stabilizer products available from Crompton Corporation, New York, N.Y.; the ADVERA® heat stabilizer products available from PQ Corporation, Valley Forge, Pa.; the ADVASTAB® heat stabilizer products available from Rohm & Haas Company, Philadelphia, Pa.; and the ADVAFLEX® heat stabilizer products available from Morton International, Inc., Chicago, Ill.

The amount of heat stabilizer, when used, can be at least 0.001, in some cases at least 0.01, in other cases at least 0.1 percent, and in some situations at least 0.2 percent by weight based on the composition. Also, the amount of heat stabilizer, when used, can be up to 1.5, in some cases up to 1.25, in other cases up to 1, and in some cases up to 0.9 percent by weight based on the composition. The amount of heat stabilizer used will be an amount sufficient to inhibit PVC degradation while allowing the composition to form fusion bonds as described above and/or possess the properties required for successful expansion operations. The amount of heat stabilizer used in the composition can be any value or range between any values recited above.

Any suitable lubricant can be used in the present composition. As used herein, the term "lubricant" refers to materials added to PVC to improve processing, for example extruding, such that the lubricant(s) prevent the PVC from sticking, for example, to metal walls of extruder barrels, calenders, mills, etc., providing smooth passage of the melt and/or to reduce the melt viscosity and prevent overheating of the PVC. As non-limiting examples, suitable lubricants include divalent metal salts of aliphatic carboxylic acids and waxes.

In an embodiment of the invention, the lubricant includes one or more $C_6$ to $C_{32}$ linear, branched or cyclic alkyl, alkenyl, aryl, aralkyl or alkaryl carboxylic acids and/or their corresponding $C_1$-$C_4$ alkyl esters or metal salts thereof. The above-described carboxylic acids can be present in the polyvinyl chloride composition at a level of at least 0.1, in some cases 0.25 and in other cases at least 0.5 percent by weight of the composition. Also, the carboxylic acids can be present at up to 5, in some cases up to 4, in other cases up to 3, and in other cases up to 2 percent by weight of the composition. In a particular embodiment of the invention, the carboxylic acid is present as a divalent metal salt. In a more particular embodiment of the invention, the divalent metal salts of carboxylic acids include calcium stearate. The amount of carboxylic acid used in the composition can be any value or range between any values recited above.

When waxes are included in the present composition as lubricants, any suitable wax can be used. Non-limiting examples of suitable waxes that can be used in the composition include hydrocarbon waxes, such as paraffinic waxes, and polyolefin waxes, such as polyethylene waxes. More particular non-limiting examples of waxes that can be used in the invention include the SUNOLITE® and HYDROBRITE® lubricants available from Crompton Corporation, the DOVERLUBE® lubricants available from Dover Chemical Corporation, the LOOBWAX™, RHEOLUBE™ and A-C® lubricants available from Honeywell, Inc., the INTERFLO® lubricants available from the International Group, Inc., the LUX® lubricants available from Lux International Inc., the MARCUS™ lubricants available from Marcus Oil & Chemical Inc., the MOORELUBE™ and PARAFLINT® lubricants available from Moore & Munger Inc., the C WAX™ and RW™ lubricants available from Reagens USA, the LUWAX® lubricants available from BASF Corporation, and the LUBOL lubricants available from L&L Industrial Chemicals Inc.

When waxes are included as lubricants in the polyvinyl chloride composition, they are included at a level of at least 0.1, in some cases 0.25, in other cases at least 0.5 and in some situations at least 1 percent by weight of the composition. Also, the waxes can be included in the composition at up to 5, in some cases up to 4.5, in other cases up to 4, in some situations up to 3 and in other situations up to 2 percent by weight of the composition. The amount of waxes used in the composition can be any value or range between any values recited above. In a particular embodiment of the invention, the waxes used in the composition include paraffin waxes and/or polyethylene waxes.

Regardless of the particular lubricant used, the amount of lubricant will be an amount sufficient to provide desired lubrication properties while allowing the composition to form fusion bonds as described above and/or possess the properties required for successful expansion operations. In an embodiment of the invention, two or more lubricants are combined, mixed, and then added to the PVC composition.

In an embodiment of the invention, one or more suitable fillers are included in the extrudable polyvinyl chloride composition. Suitable fillers include materials that are used to lower the cost of the PVC and/or to impart special properties such as hardness, abrasion resistance, and/or non-sticking, while not adversely affecting fusion joint formation or expansion properties. Suitable fillers include, but are not limited to, inorganic materials such as calcium carbonate, barite, silica, silicate, carbon black, pigments, kaolin and/or china clay. In a particular embodiment of the invention, the fillers are selected from the group consisting of pigments, clays, calcium carbonate, silica, carbon black and combinations thereof.

When fillers are included in the polyvinyl chloride composition, they are included at a level of at least 0.1, in some cases 0.25, in other cases at least 0.5 and in some situations at least 1 percent by weight of the composition. Also, the fillers can be included in the composition at up to 5, in some cases up to 4.5, in other cases up to 4, in some situations up to 3 and in other situations up to 2 percent by weight of the composition. The filler is present in an amount sufficient to provide desired properties while allowing the composition to form fusion bonds as described above and/or possess the properties required for successful expansion operations. The amount of fillers used in the composition can be any value or range between any values recited above.

In a particular embodiment of the invention, the filler can have any suitable shape, such as spherical, elliptical, or plate-like. The filler particles can have any suitable particle size that allows for providing desired properties. The particle size can be at least 0.01, in some cases at least 0.1, in other cases at least 0.25 and in some situations up to 0.5 μm. Also, the particle size of the fillers can be up to 3, in some cases up to 2 and in other situations up to 1 μm. The particle size of the filler is typically large enough to provide easy handling and lower cost but not so large as to cause weak points to form in the PVC composition that can adversely impact the strength of fusion bonds as described above and/or the strength of the PVC composition after expansion operations. The particle size of the filler can be any value or range between any values recited above.

In an embodiment of the invention, the particle size distribution is typically as close to one as is practical, and is typically less than 2. Particle size and particle size distribution can be determined using light scattering methods, such as with a MASTERSIZER® instrument available from Malvern Instruments, Ltd.

Any suitable UV stabilizer, i.e., compounds capable of providing protection against ultraviolet (UV) radiation, can be used in the present invention. Examples of suitable UV stabilizers include, but are not limited to, hindered amine light stabilizers and UV absorbers such as those available under the trade names TINUVIN® and CHIMASSORB® from Ciba Specialty Chemicals, as well as titanium dioxide.

In an embodiment of the invention, when titanium dioxide is used, it can have any suitable particle size that allows for providing desired properties. The particle size can be at least 0.001, in some cases at least 0.01, in other cases at least 0.1 and in some situations up to 0.25 μm. Also, the particle size of the titanium dioxide can be up to 2, in some cases up to 1 and in other situations up to 0.75 μm. The particle size of the titanium dioxide is typically large enough to provide easy handling and lower cost but not so large as to cause weak points to form in the PVC composition that can adversely impact the strength of fusion bonds as described above and/or the strength of the PVC composition after expansion operations. The particle size of the titanium dioxide can be any value or range between any values recited above.

In an embodiment of the invention, the particle size distribution of the titanium dioxide is typically as close to one as is practical and is typically less than 2. Particle size and particle size distribution can be determined using light scattering methods, such as with a MASTERSIZER® instrument available from Malvern Instruments, Ltd.

When compounds providing protection against UV radiation are included in the polyvinyl chloride composition, they are included at a level of at least 0.1, in some cases 0.25, in other cases at least 0.5 and in some situations at least 1 percent by weight of the composition. Also, the compounds providing protection against UV radiation can be included in the composition at up to 5, in some cases up to 4.5, in other cases up to 4, in some situations up to 3 and in other situations up to 2 percent by weight of the composition. The compounds providing protection against UV radiation are present in an amount sufficient to prevent PVC degradation due to UV exposure prior to being places into service, while allowing the composition to form fusion bonds as described above and/or possess the properties required for successful expansion operations. The amount of compounds providing protection against UV radiation used in the composition can be any value or range between any values recited above.

Any suitable processing aid known in the art can be used in the present invention. Suitable processing aids are those that do not have an adverse affect on the fusion bond. Suitable processing aids include, but are not limited to copolymers including methacrylic esters, acrylic esters, acrylonitrile and/or styrene. The amount of processing aids, when used, can be at least 0.001, in some cases at least 0.01, in other cases at least 0.1 percent, and in some situations at least 0.2 percent by weight based on the composition. Also, the amount of processing aids can be up to 2, in some situations up to 1.5, in some cases up to 1.25, in other cases up to 1, and in some instances up to 0.9 percent by weight based on the composition. The amount of processing aids used will be an amount sufficient to provide efficient processing of the PVC while allowing the composition to form fusion bonds as described above and/or possess the properties required for successful expansion operations. The amount of processing aids used in the composition can be any value or range between any values recited above.

The present polyvinyl chloride composition typically has a melting temperature of at least 125, in some cases at least 150, in many cases at least 175° C., and in some situations at least at least 190° C.

As indicated above, the polyvinyl chloride composition of the invention is used to form parts, in many cases sections of pipe, that can be combined through heat fusion. In heat fusion, portions of the PVC parts are heated above their melting point and fused together by application of force. The pressure causes flow of the melted materials, which intermix such that when the fusion joint is cooled, the strength of the joint approaches or even surpasses the strength of the PVC parts. In an embodiment of the invention, PVC pipe sections are joined by heat fusion using a fusion machine.

In an embodiment of the invention, during heat fusion, the PVC is heated to at least 125, in some cases at least 150, in other cases at least 175, and in some situations at least 190° C. Also, the PVC can be heated to up to 300, in some cases up to 250, in other cases up to 230, and in some situations up to 200° C. The PVC is heated to a temperature that will allow sufficient flow for the fusion joint to form but not so high a temperature that the PVC is degraded or excessive flow occurs. The heat fusion temperature can be any value or range between any values recited above.

During the heat fusion process, the interfacial pressure maintained between the engaged terminal edges is at least 50 psi (344,750 Pa), and in some cases at least 75 psi (517,125 Pa) and can be up to 250 psi (1,723,750 Pa), in some situations up to 200 psi (1,379,000 Pa) or in some cases up to 150 psi (1,034,250 Pa). The heat fusion pressure is a pressure that will allow sufficient flow for the fusion joint to form but not so high that the material crumples or forms an overly thick seam. The heat fusion pressure can be any value or range between any values recited above.

During the heat fusion process, the temperature and pressure are applied for at least 5 seconds, in some instances at least 15 seconds, in other instances at least 30 seconds, in many cases at least 1 minute and in other cases at least 2 minutes. Also the heat fusion process can be conducted for up to 30 minutes, in some cases 20 minutes, in other cases up to 15 minutes, and in some instances up to 10 minutes. The heat fusion process is conducted for a period of time required to form a fusion joint with the characteristics described above.

The heat fusion pressure can be conducted for any length of time or range between any lengths of time recited above. The heat fusion joint is allowed to cool over a period of time necessary for the fusion joint to properly form and develop its strength.

The present invention is also directed to extruded parts that contain the above-described polyvinyl chloride composition. As such, embodiments of the invention are directed to an extruded part that includes two or more extruded parts where at least one terminal edge of each part is fused together with at least one terminal edge of another part. In a particular embodiment of the invention, the extruded parts are sections of pipe.

In an embodiment of the invention, the fused PVC pipe sections are pulled through an existing underground conduit. As such, the fused pipe sections are inserted into the conduit and pulled through the conduit with constant tension being applied. The heat fusion joint is sufficiently strong that it does not break under the application of this tension.

More specifically, for sections of pipe where the terminal ends of at least two sections of pipe have been fused together as described above, the strength of the fusion joint is at least 50%, in some cases at least 60%, in other cases at least 70%, in some instances at least 80%, in other instances at least 90% and in some instances at least 95% of the tensile strength of the extruded pipe itself as measured by ASTM D638-2a. In some embodiments of the invention, the fusion joint can be as strong as or stronger than the extruded part. As a non-limiting example, the strength of the fusion joint can be determined using tensile testers known in the art such as the McSNAP-PER™ instrument available from McElroy Manufacturing Inc. as described in the "McElroy Fusion Catalog Reference Guide" pages 33-1 and 33-2, McElroy Manufacturing Inc., 2002.

The pipe sections according to the invention can have a diameter of at least 0.5 inches (1.25 cm), in some instances at least 1 inch (2.54 cm), in other instances at least 2 inches (5.1 cm), in some situations at least 3 inches (7.6 cm), in some cases at least 4 inches (10 cm), and in other cases at least 5 inches (12.7 cm). Also, pipe sections according to the invention can have a diameter of up to 60 inches (153 cm), in some cases up to 40 inches (101.6 cm) and in other cases up to 30 inches (76.2 cm). The diameter of the pipe sections according to the invention can be any value or range between any of the values recited above.

The pipe sections according to the invention have a wall thickness of at least 0.05 inches (0.125 cm), in some cases at least 0.1 inches (0.25 cm), and in other cases at least 0.25 inches (0.64 cm). Also, the pipe sections according to the invention have a wall thickness of up to 3 inches (7.6 cm), in some cases up to 2 inches (5 cm), in other cases up to 1 inch (2.5 cm) and in some situations up to 0.5 inches (1.25 cm). The wall thickness of the pipe sections can be any value or range between any of the values recited above.

In an embodiment of the invention, after the pipe sections have been inserted into an existing conduit, the pipe sections can be heated and pressure applied to expand the pipe sections to the inner diameter of the conduit. The temperature and pressure are high enough to effect expansion while not substantially degrading the strength of the pipe sections.

After heating, pressure is applied, which can be at least 50 psi (344,750 Pa), in some cases at least 60 psi (412,700 Pa), in other cases at least 75 psi (517,125 Pa) and in some situations at least 100 psi (689,500 Pa). Also, the pressure can be up to 200 psi (1,379,000 Pa), in some cases at least 175 psi (1,206,625 Pa) and in other cases at least 150 psi (1,034,250 Pa). The expansion pressure can be any value or range between any values recited above.

In the expansion operation, the diameter of the pipe is expanded at least 1.05 times, in some instances at least 1.1 times, in some cases at least 1.25 times and in other cases at least 1.5 times the original pipe diameter. Also, the expanded pipe diameter can be up to 3 times, in some cases up to 2.5 times and in other cases up to 2 times the original pipe diameter. The expanded diameter can be any value or can range between any of the values recited above.

In the expansion operation, the wall thickness of the pipe is reduced at least 0.98, in some instances at least 0.95, in some cases at least 0.9 and in other cases at least 0.85 times the original pipe wall thickness. Also, the expanded pipe wall thickness will be not less than 0.3, in some cases not less than 0.5 and in other cases not less than 0.65 times the original pipe wall thickness. The wall thickness of the expanded pipe can be any value or can range between any of the values recited above.

The pressure rating of the expanded pipe is at least 50%, in some cases at least 60%, in other cases at least 75%, in some situations at least 85% of the pressure rating of the pre-expanded pipe and the hydrostatic design basis can be at least 100% and in some cases up to 175% or more of the hydrostatic design basis of the pre-expanded pipe.

Particular embodiments of the invention are directed to an extrudable polyvinyl chloride composition that contains from 80 to 99.9 percent by weight polyvinyl chloride. Pipe sections formed by extruding the polyvinyl chloride composition, which are expanded such that the expanded tube diameter is from 1.05 to 3 times the pre-expanded tube diameter, have a pressure rating and/or hydrostatic design basis of at least 50% of the pressure rating of the pre-expanded pipe as measured according to ASTM D2241, AWWA C900, and/or AWWA C905.

Embodiments of the invention provide a water pipe that includes pipe sections as described above, that have been fused together by heat fusion and that include the above-described polyvinyl chloride composition. The water pipes can be positioned within an existing conduit or expanded, as described above within the conduit, inserted in horizontal lines, drilling mounted, pipe bushing, guided boring, direct boring and other applications.

Water pipes according to the invention have a burst strength of at least 200 psi (1,379,000 Pa), in some instances at least 350 psi (2,413,250 Pa), in other instances at least 500 psi (3,447,500 Pa), in some cases at least 750 psi (5,171,250 Pa) and in other cases at least 890 psi (6,136,550 Pa) as determined by ASTM D1785 in accordance with ASTM D1599 (Procedure B).

In an embodiment of the invention, the PVC compositions and water pipes containing such meet the requirement for use with potable water, such as those set forth in *PPI PVC Range Composition, Listing of Qualified Ingredients TR*-2/2004, Plastics Pipe Institute, Washington, D.C., 2004, the relevant portions of which are herein incorporated by reference.

Embodiments of the invention also provide gravity drain pipes, for example sanitary pipes, that includes pipe sections as described above, that have been fused together by heat fusion and that include the above described polyvinyl chloride composition. The gravity drain pipes can be positioned within an existing conduit or expanded, as described above within the conduit, inserted in horizontal directional drilling, pipe bursting, guided boring, direct bury and other applications.

Embodiments of the invention also provide utility conduit, for example conduit through which electrical or fiber optic cables are run, that includes pipe sections as described above, that have been fused together by heat fusion and that include the above-described polyvinyl chloride composition. The utility conduit can be positioned within an existing conduit or expanded, as described above within the conduit, inserted in horizontal directional drilling, pipe bursting, guided boring, direct bury and other applications.

The present invention is more particularly described in the following examples, which are intended to be illustrative only, since numerous modifications and variations therein will be apparent to those skilled in the art. Unless otherwise specified, all parts and percentages are by weight.

Example 1

This example is a polyvinyl chloride composition according to the invention. The ingredients below were combined with 100% virgin PVC resin with no regrind and extruded to form 20 foot (6 m) PVC pipe sections. (All ingredients are parts per hundred based on the PVC resin).

| Ingredient | Amount |
| --- | --- |
| Lubricant combination of calcium stearate, paraffin wax and polyethylene wax | 2 pph |
| Titanium Dioxide | 3 pph |
| Calcium Carbonate | 2 pph |
| Processing Aid (Rohm & Haas K120N) | 1 pph |
| Blue Colorant (Color Matrix) | 0.2 pph |
| Heat Stabilizer | 0.8 pph |

Example 2

Sections of pipe were extruded as in Example 1 having an outside diameter of 6.6 inches and a wall thickness of 0.4 inches. Two sections of pipe were heat fused using a Model No. 28 hydraulic fusion machine available from McElroy Manufacturing, Inc. at 140 psi interfacial pressure, 204° C. for approximately two minutes and cooled under ambient conditions for about 15 minutes. Two samples were burst-tested according to ASTM D1785, section 6.3 in accordance with ASTM D1599 (Procedure B) at 23° C. after conditioning for 16 hours at 23° C. such that the first sample consisted of only the pipe section (2A) and the second sample had the fusion bond (2B). The minimum acceptable burst pressure is 890 psi. The data are summarized below.

|  | Sample 2A | Sample 2B |
| --- | --- | --- |
| Burst Pressure | 1210 psi | 1190 psi |
| Time-to Fail | 95 seconds | 75 seconds |

The heat fused extruded polyvinyl chloride pipe according to the invention provides more than acceptable burst test performance. The pipe did not fail at the joint, but in a normal bursting mode.

Example 3

Pipe sections of 16-inch diameter were prepared as in Example 1. The sections were heat fused as described in Example 2. Specimens were removed from the fused pipe with the fused section in the middle (samples in triplicate), as well as sections without the fusion joint. Izod impact testing was conducted on a set of samples according to ASTM D256-02. Tensile properties were evaluated according to ASTM D638-2a on samples with and without the fusion joint at a speed of 0.2 inches per minute. Flexural properties were evaluated according to ASTM D790-03 on samples with and without the fusion joint at a 16:1 span to depth ratio. The results are shown below:

| Test Property | Result |
| --- | --- |
| Izod impact strength (no fusion joint) | 0.59 ft-lb/in |
| Izod impact strength (with fusion joint) | 0.41 ft-lb/in |
| Tensile strength at Yield (no fusion joint) | 7020 psi |
| Tensile strength at Yield (with fusion joint) | 5775 psi |
| Modulus of Elasticity (no fusion joint) | 391,900 psi |
| Modulus of Elasticity (with fusion joint) | 409,500 psi |
| Flexural strength (no fusion joint) | 11,395 psi |
| Flexural strength (with fusion joint) | 8,121 psi |
| Flexural Modulus (no fusion joint) | 429,000 psi |
| Flexural Modulus (with fusion joint) | 415,600 psi |

The joint strength was about 82.5%. Thus, the examples show the excellent strength of the fusion joints made according to the invention.

Example 4

Pipe sections of 4- and 6-inch diameter were prepared as in Example 1 and heat fused as in Example 2 under the temperature/pressure conditions in the table below. Coupons were cut from the pipe containing the fused joint in the middle, as well as coupons cut from the wall of the pipe without any fusion joints. The coupons were evaluated using a McSNAPPER™ instrument available from McElroy Manufacturing Inc. as described in the "McElroy Fusion Catalog Reference Guide" pages 33-1 and 33-2, McElroy Manufacturing Inc., 2002. The results below show the stress at break for the fusion joint sample and the corresponding percentage based on the non-fusion sample.

| Pipe Diameter | Fusion Pressure | Fusion Temperature | Stress | Percentage of control sample |
| --- | --- | --- | --- | --- |
| 4" | 150 psi | 204° C. | 8905 psi | 94% |
| 4" | 150 psi | 218° C. | 9176 psi | 96% |
| 4" | 130 psi | 204° C. | 9035 psi | 95% |
| 4" | 130 psi | 218° C. | 8957 psi | 94% |
| 6" | 150 psi | 204° C. | 7641 psi | 80% |
| 6" | 150 psi | 218° C. | 8896 psi | 93% |
| 6" | 130 psi | 204° C. | 7620 psi | 80% |
| 6" | 130 psi | 218° C. | 8999 psi | 95% |

Example 5

This example shows the expansion properties of the fused polyvinyl chloride pipe sections according to the invention. Pipe sections of 8-inch diameter were made as in Example 1 and heat fused as in Example 2. The fused pipe sections were pulled through a 14-inch cast iron pipe and all fusion joints found to be intact after inspection. Water at 93° C. was circulated through the pipe for about 2 hours at a pressure of about 50 psi to bring the pipe to temperature. The circulation pump pressure was then increased to 225 to 240 psi and expansion and cool down took about three hours, after which time the pressure was relieved and the water drained from the system. Inspection showed that the pipe had expanded to the diameter of the cast iron conduit and that all fusion joints were intact, showing no signs of fracture.

The experiment was repeated with pipes having different diameters, which resulted in different wall thicknesses in the resulting expanded pipe. The hoop stress of pipe sections was measured according to ASTM D2290 at various wall thickness ratios (expanded wall thickness divided by original wall thickness). The results are shown below.

| Wall thickness ratio | Hoop Stress (psi) |
|---|---|
| Original, no expansion | 8,000 |
| 1.1 | 8,750 |
| 1.2 | 9,700 |
| 1.3 | 10,000 |
| 1.6 | 11,900 |
| 1.8 | 13,000 |
| 1.9 | 14,500 |
| 2.1 | 15,000 |

The data shows the increase in hoop stress realized after expansion of the heat fused extruded PVC compositions of the present invention.

The present invention has been described with reference to specific details of particular embodiments thereof. It is not intended that such details be regarded as limitations upon the scope of the invention except insofar as and to the extent that they are included in the accompanying claims.

What is claimed is:

1. Fused pipe sections, the fused pipe sections comprising:
   (a) a first pipe section prepared from a composition comprising polyvinyl chloride, the first pipe section having a terminal edge;
   (b) a second pipe section prepared from a composition comprising polyvinyl chloride, the second pipe section having a terminal edge; and
   wherein the terminal edge of the first pipe section and the terminal edge of the second pipe section are butt fused to form a butt fused joint having a tensile strength that is at least 50% of the tensile strength of the pipe sections as measured by ASTM D638-2a,
   wherein an interior sidewall of the first pipe section is free of overlap with an exterior sidewall of the second pipe section and an interior sidewall of the second pipe section is free of overlap with an exterior sidewall of the first pipe section.

2. Fused pipe sections comprising:
   (a) a first pipe section prepared from a composition comprising 85 to 99 percent by weight of polyvinyl chloride, 0.001 to 1.5 percent by weight of heat stabilizer, 0.1 to 5 percent by weight of one or more divalent metal salts of one or more $C_6$ to $C_{32}$ linear, branched or cyclic alkyl, alkenyl, aryl, aralkyl or alkaryl carboxylic acids, 0.1 to 5 percent by weight of wax, 0.1 to 5 percent by weight of UV stabilizer, 0.1 to 5 percent by weight of filler, and 0.001 to 2 percent by weight of acrylic processing aid; the first pipe section having a terminal edge;
   (b) a second pipe section prepared from a composition comprising polyvinyl chloride, the second pipe section having a terminal edge; and
   (c) a butt fused joint formed from the butt fusion of the terminal edge of the first pipe section and the terminal edge of the second pipe section, wherein the butt fused joint has a tensile strength that is at least 50% of the tensile strength of the pipe sections as measured by ASTM D638-2a,
   wherein an interior sidewall of the first pipe section is free of overlap with an exterior sidewall of the second pipe section and an interior sidewall of the second pipe section is free of overlap with an exterior sidewall of the first pipe section.

3. Fused pipe sections comprising:
   (a) a first pipe section prepared from a composition comprising polyvinyl chloride, the first pipe section having a terminal edge;
   (b) a second pipe section prepared from a composition comprising polyvinyl chloride, the second pipe section having a terminal edge; and
   (c) a butt fused joint formed from butt fusion of the terminal edge of the first pipe section and the terminal edge of the second pipe section, wherein the butt fused joint has a tensile strength that is at least 50% of the tensile strength of the pipe sections as measured by ASTM D638-2a,
   wherein an interior sidewall of the first pipe section is free of overlap with an exterior sidewall of the second pipe section and an interior sidewall of the second pipe section is free of overlap with an exterior sidewall of the first pipe section.

4. Fused pipe sections, the fused pipe sections comprising:
   (a) a first pipe section prepared from a composition comprising 85 to 99 percent by weight of polyvinyl chloride, 0.001 to 1.5 percent by weight of heat stabilizer, 0.1 to 5 percent by weight of one or more divalent metal salts of one or more $C_6$ to $C_{32}$ linear, branched or cyclic alkyl, alkenyl, aryl, aralkyl or alkaryl carboxylic acids, 0.1 to 5 percent by weight of wax, 0.1 to 5 percent by weight of UV stabilizer, 0.1 to 5 percent by weight of filler, and 0.001 to 2 percent by weight of acrylic processing aid, the first pipe section having a terminal edge;
   (b) a second pipe section prepared from a composition comprising 85 to 99 percent by weight of polyvinyl chloride, 0.001 to 1.5 percent by weight of heat stabilizer, 0.1 to 5 percent by weight of one or more divalent metal salts of one or more $C_6$ to $C_{32}$ linear, branched or cyclic alkyl, alkenyl, aryl, aralkyl or alkaryl carboxylic acids, 0.1 to 5 percent by weight of wax, 0.1 to 5 percent by weight of UV stabilizer, 0.1 to 5 percent by weight of filler, and 0.001 to 2 percent by weight of acrylic processing aid,
   the second pipe section having a terminal edge; and
   wherein the terminal edge of the first pipe section and the terminal edge of the second pipe section are butt fused to form a butt fused joint having a tensile strength that is at least 50% of the tensile strength of the pipe sections as measured by ASTM D638-2a, wherein an interior sidewall of the first pipe section is free of overlap with an exterior sidewall of the second pipe section and an interior sidewall of the second pipe section is free of overlap with an exterior sidewall of the first pipe section.

5. A pipe system, comprising:
   a plurality of butt fused, extruded pipe sections prepared from a composition comprising 85 to 99 percent by weight of polyvinyl chloride, 0.001 to 1.5 percent by weight of heat stabilizer, 0.1 to 5 percent by weight of one or more divalent metal salts of one or more $C_6$ to $C_{32}$ linear, branched or cyclic alkyl, alkenyl, aryl, aralkyl or alkaryl carboxylic acids, 0.1 to 5 percent by weight of wax, 0.1 to 5 percent by weight of UV stabilizer, 0.1 to 5 percent by weight of filler, and 0.001 to 2 percent by weight of acrylic processing aid, and wherein at least one butt fused joint area exhibits a tensile strength sufficient to permit the pipe system to be pulled without breaking the at least one butt fused joint area, wherein the butt fused joint area is prepared by fusing terminal edges of a first pipe section and a second pipe section, and wherein an interior sidewall of the first pipe section is free of overlap with an exterior sidewall of the second pipe section and an interior sidewall of the second pipe section is free of overlap with an exterior sidewall of the first pipe section.

6. Fused pipe sections comprising:
   (a) a first pipe section prepared from a composition comprising 85 to 99 percent by weight of polyvinyl chloride, 0.1 to 1.5 percent by weight of heat stabilizer, 0.1 to 2 percent by weight of one or more divalent metal salts of one or more $C_6$ to $C_{32}$ linear, branched or cyclic alkyl, alkenyl, aryl, aralkyl or alkaryl carboxylic acids, 0.1 to 5 percent by weight of wax, 0.1 to 5 percent by weight of UV stabilizer, 0.1 to 2 percent by weight of filler, and 0.001 to 1 percent by weight of acrylic processing aid; the first pipe section having a terminal edge;
   (b) a second pipe section prepared from a composition comprising polyvinyl chloride, the second pipe section having a terminal edge; and
   (c) a butt fused joint formed from the butt fusion of the terminal edge of the first pipe section and the terminal edge of the second pipe section, wherein the butt fused joint has a tensile strength that is at least 50% of the tensile strength of the pipe sections as measured by ASTM D638-2a, wherein an interior sidewall of the first pipe section is free of overlap with an exterior sidewall of the second pipe section and an interior sidewall of the second pipe section is free of overlap with an exterior sidewall of the first pipe section.

7. Fused pipe sections, the fused pipe sections comprising:
   (a) a first pipe section prepared from a composition comprising 85 to 99 percent by weight of polyvinyl chloride, 0.1 to 1.5 percent by weight of heat stabilizer, 0.1 to 2 percent by weight of one or more divalent metal salts of one or more $C_6$ to $C_{32}$ linear, branched or cyclic alkyl, alkenyl, aryl, aralkyl or alkaryl carboxylic acids, 0.1 to 5 percent by weight of wax, 0.1 to 5 percent by weight of UV stabilizer, 0.1 to 2 percent by weight of filler, and 0.001 to 1 percent by weight of acrylic processing aid, the first pipe section having a terminal edge;
   (b) a second pipe section prepared from a composition comprising 85 to 99 percent by weight of polyvinyl chloride, 0.1 to 1.5 percent by weight of heat stabilizer, 0.1 to 2 percent by weight of one or more divalent metal salts of one or more $C_6$ to $C_{32}$ linear, branched or cyclic alkyl, alkenyl, aryl, aralkyl or alkaryl carboxylic acids, 0.1 to 5 percent by weight of wax, 0.1 to 5 percent by weight of UV stabilizer, 0.1 to 2 percent by weight of filler, and 0.001 to 1 percent by weight of acrylic processing aid, the second pipe section having a terminal edge; and wherein the terminal edge of the first pipe section and the terminal edge of the second pipe section are butt fused to form a butt fused joint having a tensile strength that is at least 50% of the tensile strength of the pipe sections as measured by ASTM D638-2a, wherein an interior sidewall of the first pipe section is free of overlap with an exterior sidewall of the second pipe section and an interior sidewall of the second pipe section is free of overlap with an exterior sidewall of the first pipe section.

8. A pipe system, comprising:
   a plurality of butt fused, extruded pipe sections prepared from a composition comprising 85 to 99 percent by weight of polyvinyl chloride, 0.1 to 1.5 percent by weight of heat stabilizer, 0.1 to 2 percent by weight of one or more divalent metal salts of one or more $C_6$ to $C_{32}$ linear, branched or cyclic alkyl, alkenyl, aryl, aralkyl or alkaryl carboxylic acids, 0.1 to 5 percent by weight of wax, 0.1 to 5 percent by weight of UV stabilizer, 0.1 to 2 percent by weight of filler, and 0.001 to 1 percent by weight of acrylic processing aid, and wherein at least one butt fused joint area exhibits a tensile strength sufficient to permit the pipe system to be pulled without breaking the at least one butt fused joint area, wherein the butt fused joint area is prepared by fusing terminal edges of a first pipe section and a second pipe section, and wherein an interior sidewall of the first pipe section is free of overlap with an exterior sidewall of the second pipe section and an interior sidewall of the second pipe section is free of overlap with an exterior sidewall of the first pipe section.

9. Fused pipe sections comprising:
   (a) a first pipe section prepared from a composition comprising 85 to 99 percent by weight of polyvinyl chloride, 0.001 to 1.5 percent by weight of heat stabilizer, 0.1 to 5 percent by weight of one or more divalent metal salts of one or more $C_6$ to $C_{32}$ linear, branched or cyclic alkyl, alkenyl, aryl, aralkyl or alkaryl carboxylic acids, 0.1 to 5 percent by weight of wax, and 0.1 to 5 percent by weight of ITV stabilizer;
   the first pipe section having a terminal edge;
   (b) a second pipe section prepared from a composition comprising polyvinyl chloride, the second pipe section having a terminal edge; and
   (c) a butt fused joint formed from the butt fusion of the terminal edge of the first pipe section and the terminal edge of the second pipe section, wherein the butt fused joint has a tensile strength that is at least 50% of the tensile strength of the pipe sections as measured by ASTM D638-2a, wherein an interior sidewall of the first pipe section is free of overlap with an exterior sidewall of the second pipe section and an interior sidewall of the second pipe section is free of overlap with an exterior sidewall of the first pipe section.

10. A pipe system, comprising:
    a plurality of butt fused, extruded pipe sections prepared from a composition comprising 85 to 99 percent by weight of polyvinyl chloride, 0.001 to 1.5 percent by weight of heat stabilizer, 0.1 to 5 percent by weight of one or more divalent metal salts of one or more $C_6$ to $C_{32}$ linear, branched or cyclic alkyl, alkenyl, aryl, aralkyl or alkaryl carboxylic acids, 0.1 to 5 percent by weight of wax, and 0.1 to 5 percent by weight of UV stabilizer, and wherein at least one butt fused joint area exhibits a tensile strength sufficient to permit the pipe system to be pulled without breaking the at least one butt fused joint area, wherein the butt fused joint area is prepared by fusing terminal edges of a first pipe section and a second pipe section, and wherein an interior sidewall of the first pipe section is free of overlap with an exterior sidewall of the second pipe section and an interior sidewall of the second pipe section is free of overlap with an exterior sidewall of the first pipe section.

11. The fused pipe sections according to claim 1, wherein the polyvinyl chloride is virgin polyvinyl chloride.

12. The fused pipe sections according to claim 1, wherein the polyvinyl chloride composition comprises 85 to 99.95 percent by weight of polyvinyl chloride.

13. The fused pipe sections according to claim 1, wherein the polyvinyl chloride composition further comprises from 0.001 to 1.5 percent by weight of one or more heat stabilizers.

14. The fused pipe sections according to claim 1, wherein the polyvinyl chloride composition further comprises from 0.1 to 5 percent by weight of one or more divalent metal salts of one or more $C_6$ to $C_{32}$ linear, branched or cyclic alkyl, alkenyl, aryl, aralkyl or alkaryl carboxylic acids.

15. The fused pipe sections according to claim 14, wherein the divalent metal salts of carboxylic acids comprise calcium stearate.

16. The fused pipe sections according to claim 1, wherein the polyvinyl chloride composition further comprises from 0.1 to 5 percent by weight of one or more waxes.

17. The fused pipe sections according to claim 16, wherein the waxes comprise one or both of a paraffin wax and a polyethylene wax.

18. The fused pipe sections according to claim 1, wherein the polyvinyl chloride composition further comprises from 0.1 to 2 percent by weight of one or more fillers.

19. The fused pipe sections according to claim 18, wherein the fillers are selected from the group consisting of pigments, clays, calcium carbonate, silica, carbon black or any combination thereof.

20. The fused pipe sections according to claim 19, wherein the polyvinyl chloride composition comprises 0.1 percent to 2 percent by weight of calcium carbonate.

21. The fused pipe sections according to claim 1, wherein the polyvinyl chloride composition further comprises 0.1 percent to 5 percent by weight of UV stabilizer.

22. The fused pipe sections according to claim 20, wherein the polyvinyl chloride composition further comprises 0.001 to 2 percent by weight of acrylic processing aid.

23. The fused pipe sections according to claim 1, wherein the polyvinyl chloride composition further comprises 0.001 to 2 percent by weight of acrylic processing aid.

24. The fused pipe sections according to claim 1, wherein the polyvinyl chloride composition has a melting temperature of at least 125° C.

25. The fused pipe sections according to claim 1, wherein the pipe sections form at least one of a water pipe, a gravity drain sanitary pipe, a sewer pipe, a pressurized pipe, a utility conduit, a pipe inserted via horizontal directional drilling, a pipe used in a pipe bursting application, a pipe used in guided boring, a pipe used in slip lining and a pipe used in direct bury applications or combinations thereof.

26. The fused pipe sections according to claim 1, wherein the pipe sections have a diameter of from 0.5 inches (1.27 cm) to 60 inches (153 cm).

27. The fused pipe sections according to claim 1, wherein the pipe sections have a wall thickness of from 0.05 inches (0.125 cm) to 3 inches (7.6 cm).

28. The pipe system according to claim 5, wherein the at least one butt fused joint area exhibits a tensile strength that is at least 50% of the tensile strength of the pipe sections as measured by ASTM D638-2a.

29. A pipe conduit system, comprising:
  (a) a conduit; and
  (b) a pipe system according to claim 5 positioned within the conduit.

30. The pipe conduit system according to claim 29, wherein the pipe system is radially expanded to the inner diameter of the conduit.

31. The fused pipe sections according to claim 1, wherein only a first terminal edge of the first pipe section is fused to a second terminal edge of the second pipe section.

32. The fused pipe sections according to claim 2, wherein only a first terminal edge of the first pipe section is fused to a second terminal edge of the second pipe section.

33. The fused pipe sections according to claim 3, wherein only a first terminal edge of the first pipe section is fused to a second terminal edge of the second pipe section.

34. The fused pipe sections according to claim 4, wherein only a first terminal edge of the first pipe section is fused to a second terminal edge of the second pipe section.

35. The pipe system according to claim 5, wherein the plurality of butt fused, extruded pipe sections comprises a first pipe section and a second pipe section, and wherein only a first terminal edge of the first pipe section is fused to a second terminal edge of the second pipe section to form the at least one butt fused joint area.

36. The fused pipe sections according to claim 3, wherein the polyvinyl chloride is virgin polyvinyl chloride.

37. The fused pipe sections according to claim 3, wherein the polyvinyl chloride composition of the first pipe section and/or the polyvinyl chloride composition of the second pipe section comprises 85 to 99.95 percent by weight of polyvinyl chloride.

38. The fused pipe sections according to claim 3, wherein the polyvinyl chloride composition of the first pipe section and/or the polyvinyl chloride composition of the second pipe section further comprises from 0.001 to 1.5 percent by weight of one or more heat stabilizers.

39. The fused pipe sections according to claim 3, wherein the polyvinyl chloride composition of the first pipe section and/or the polyvinyl chloride composition of the second pipe section further comprises from 0.1 to 5 percent by weight of one or more divalent metal salts of one or more $C_6$ to $C_{32}$ linear, branched or cyclic alkyl, alkenyl, aryl, aralkyl or alkaryl carboxylic acids.

40. The fused pipe sections according to claim 39, wherein the divalent metal salts of carboxylic acids comprise calcium stearate.

41. The fused pipe sections according to claim 3, wherein the polyvinyl chloride composition of the first pipe section and/or the polyvinyl chloride composition of the second pipe section further comprises from 0.1 to 5 percent by weight of one or more waxes.

42. The fused pipe sections according to claim 41, wherein the waxes comprise one or both of a paraffin wax and a polyethylene wax.

43. The fused pipe sections according to claim 3, wherein the polyvinyl chloride composition of the first pipe section and/or the polyvinyl chloride composition of the second pipe section further comprises from 0.1 to 2 percent by weight of one or more fillers.

44. The fused pipe sections according to claim 43, wherein the fillers are selected from the group consisting of pigments, clays, calcium carbonate, silica, carbon black or any combination thereof.

45. The fused pipe sections according to claim 44, wherein the polyvinyl chloride composition comprises 0.1 percent to 2 percent by weight of calcium carbonate.

46. The fused pipe sections according to claim 3, wherein the polyvinyl chloride composition of the first pipe section and/or the polyvinyl chloride composition of the second pipe section further comprises 0.1 percent to 5 percent by weight of UV stabilizer.

47. The fused pipe sections according to claim 3, wherein the polyvinyl chloride composition of the first pipe section and/or the polyvinyl chloride composition of the second pipe section further comprises 0.001 to 2 percent by weight of acrylic processing aid.

48. The fused pipe sections according to claim 3, wherein the polyvinyl chloride composition of the first pipe section and/or the polyvinyl chloride composition of the second pipe section has a melting temperature of at least 125° C.

49. The fused pipe sections according to claim 3, wherein the pipe sections form at least one of a water pipe, a gravity drain sanitary pipe, a sewer pipe, a pressurized pipe, a utility conduit, a pipe inserted via horizontal directional drilling, a pipe used in a pipe bursting application, a pipe used in guided boring, a pipe used in slip lining and a pipe used in direct bury applications or combinations thereof.

50. The fused pipe sections according to claim 3, wherein the pipe sections have a diameter of from 0.5 inches (1.27 cm) to 60 inches (153 cm).

51. The fused pipe sections according to claim 3, wherein the pipe sections have a wall thickness of from 0.05 inches (0.125 cm) to 3 inches (7.6 cm).

52. The fused pipe sections according to claim 1, wherein the polyvinyl chloride composition comprises up to 2 weight percent of pigment.

53. The fused pipe sections according to claim 2, wherein the polyvinyl chloride composition further comprises up to 2 weight percent of pigment.

54. The fused pipe sections according to claim 3, wherein the polyvinyl chloride composition of the first pipe section and/or the polyvinyl chloride composition of the second pipe section further comprises up to 2 weight percent of pigment.

55. The fused pipe sections according to claim 16, wherein the polyvinyl chloride composition comprises 0.5 to 2 percent wax.

56. The fused pipe sections according to claim 2, wherein the polyvinyl chloride composition comprises 0.5 to 2 percent wax.

57. The fused pipe sections according to claim 41, wherein the polyvinyl chloride composition comprises 0.5 to 2 percent wax.

58. The fused pipe sections according to claim 4, wherein the polyvinyl chloride composition of the first pipe section and/or the polyvinyl chloride composition of the second pipe section comprises 0.5 to 2 percent wax.

59. The pipe system according to claim 5, wherein the polyvinyl chloride composition comprises 0.5 to 2 percent wax.

60. The fused pipe sections according to claim 1, wherein the polyvinyl chloride composition further comprises calcium stearate, paraffin wax and polyethylene wax.

61. The fused pipe sections according to claim 2, wherein the polyvinyl chloride composition further comprises calcium stearate, paraffin wax and polyethylene wax.

62. The fused pipe sections according to claim 3, wherein the polyvinyl chloride composition further comprises calcium stearate, paraffin wax and polyethylene wax.

63. The fused pipe sections according to claim 4, wherein the polyvinyl chloride composition of the first pipe section and/or the polyvinyl chloride composition of the second pipe section further comprises calcium stearate, paraffin wax and polyethylene wax.

64. The pipe system according to claim 5, wherein the polyvinyl chloride composition further comprises calcium stearate, paraffin wax and polyethylene wax.

65. The fused pipe sections according to claim 1, wherein the polyvinyl chloride composition further comprises from 0.1 to 1.5 percent by weight of one or more heat stabilizers.

66. The fused pipe sections according to claim 1, wherein the polyvinyl chloride composition further comprises from 0.1 to 5 percent by weight of one or more divalent metal salts of one or more $C_6$ to $C_{32}$ linear, branched or cyclic alkyl, alkenyl, aryl, aralkyl or alkaryl carboxylic acids.

67. The fused pipe sections according to claim 1, wherein the polyvinyl chloride composition further comprises 0.1 percent to 2 percent by weight of UV stabilizer.

68. The fused pipe sections according to claim 20, wherein the polyvinyl chloride composition further comprises 0.001 to 1 percent by weight of acrylic processing aid.

69. The fused pipe sections according to claim 1, wherein the polyvinyl chloride composition further comprises 0.001 to 1 percent by weight of acrylic processing aid.

70. The fused pipe sections according to claim 3, wherein the polyvinyl chloride composition of the first pipe section and/or the polyvinyl chloride composition of the second pipe section further comprises from 0.1 to 1.5 percent by weight of one or more heat stabilizers.

71. The fused pipe sections according to claim 3, wherein the polyvinyl chloride composition of the first pipe section and/or the polyvinyl chloride composition of the second pipe section further comprises from 0.1 to 2 percent by weight of one or more divalent metal salts of one or more $C_6$ to $C_{32}$ linear, branched or cyclic alkyl, alkenyl, aryl, aralkyl or alkaryl carboxylic acids.

72. The fused pipe sections according to claim 3, wherein the polyvinyl chloride composition of the first pipe section and/or the polyvinyl chloride composition of the second pipe section further comprises 0.1 percent to 2 percent by weight of UV stabilizer.

73. The fused pipe sections according to claim 3, wherein the polyvinyl chloride composition of the first pipe section and/or the polyvinyl chloride composition of the second pipe section further comprises 0.001 to 1 percent by weight of acrylic processing aid.

* * * * *

UNITED STATES PATENT AND TRADEMARK OFFICE
CERTIFICATE OF CORRECTION

| | | |
|---|---|---|
| PATENT NO. | : 8,058,378 B1 | Page 1 of 1 |
| APPLICATION NO. | : 12/357488 | |
| DATED | : November 15, 2011 | |
| INVENTOR(S) | : Mark A. Smith et al. | |

It is certified that error appears in the above-identified patent and that said Letters Patent is hereby corrected as shown below:

Column 16, Line 27, Claim 9, delete "ITV" and insert -- UV --

Signed and Sealed this
Thirteenth Day of March, 2012

David J. Kappos
*Director of the United States Patent and Trademark Office*